2 Sheets—Sheet 2.
G. HARRIS.
DRIERS FOR FRUIT AND OTHER ARTICLES.
No. 193,947.               Patented Aug. 7, 1877.
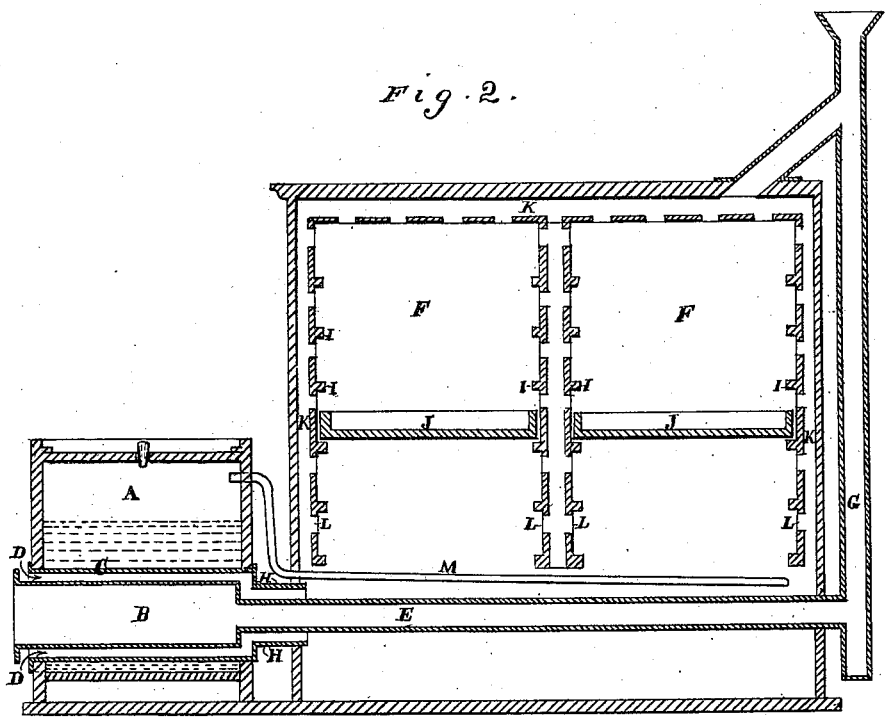
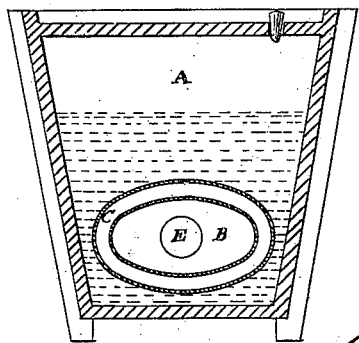
Witnesses
Geo. H. Strong
Olwyn T. Stacy
Inventor
George Harris
By Dewey & Co.
Atty's

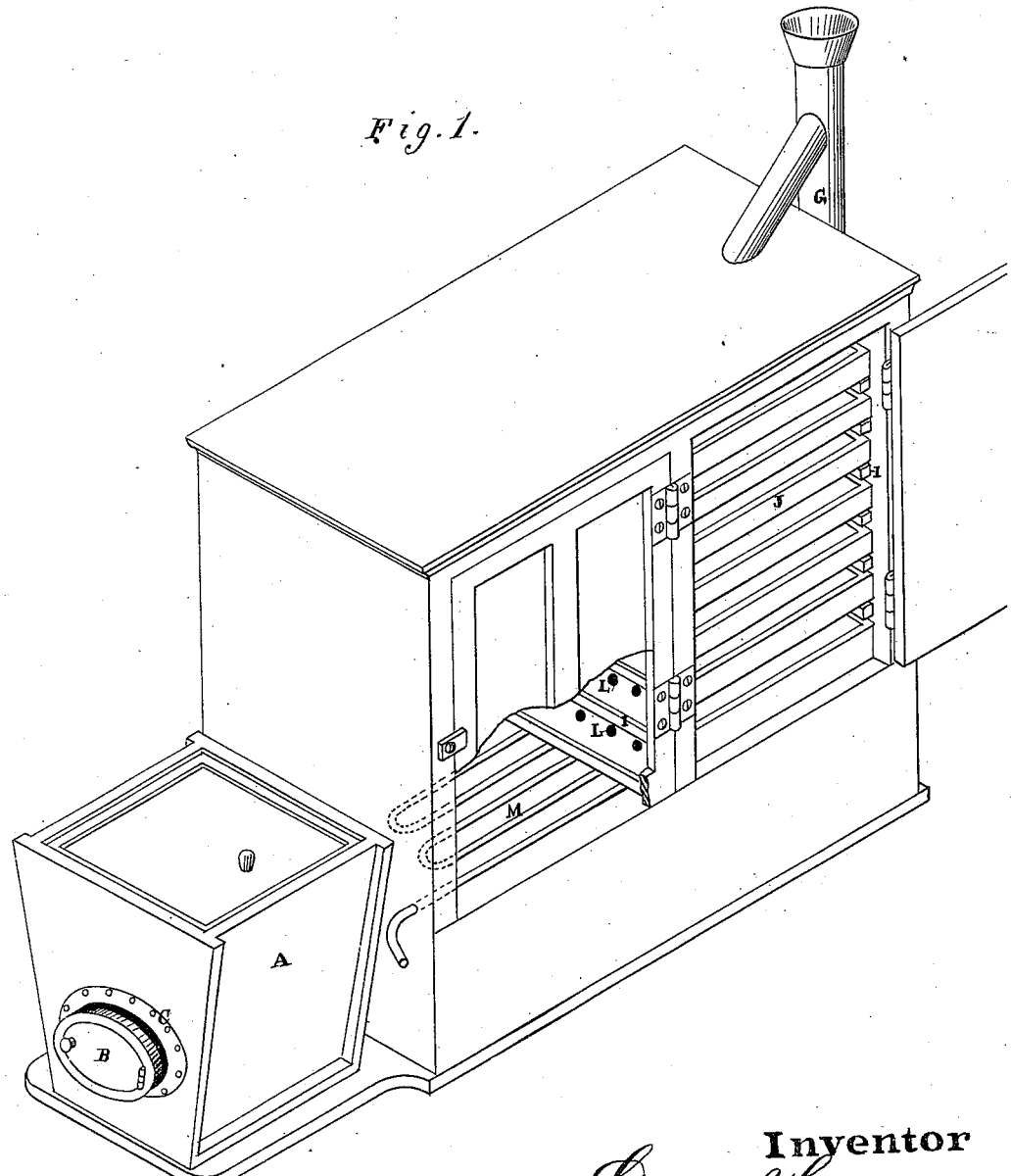

UNITED STATES PATENT OFFICE.

GEORGE HARRIS, OF PETALUMA, CALIFORNIA.

IMPROVEMENT IN DRIERS FOR FRUIT AND OTHER ARTICLES.

Specification forming part of Letters Patent No. 193,947, dated August 7, 1877; application filed April 9, 1877.

*To all whom it may concern:*

Be it known that I, GEORGE HARRIS, of Petaluma, county of Sonoma, and State of California, have invented an Improved Heater and Drier; and I do hereby declare the following to be a full, clear, and exact description thereof, reference being had to the accompanying drawings.

My invention relates to a novel heater for water and air, and a means for distributing the heat so produced, either of the air or steam or both, so that it may be utilized for all purposes of drying, as in fruit-drying and for laundry and other purposes.

My invention consists, first, in a novel manner of constructing a heater, so that a thin body of water or air shall be in contact with the heating-surface, and the fuel can be utilized to the utmost, the hot air being conveyed into a drying-chamber where it is distributed to all parts, and the steam also being conveyed through the chamber in pipes to assist in the drying, the condensed water being used to replenish the boiler.

Referring to the accompanying drawings for a more complete explanation of my invention, Figure 1 is a perspective view of my machine. Fig. 2 is a longitudinal vertical section of my heater and drier. Fig. 3 is a transverse section of the heater.

A is a case, tank, or containing-vessel made of wood. Through the lower part of this vessel my fire-place B passes.

The fire-place is made and secured within the tank in a manner similar to that described in a patent for cheese-vat heaters, issued to me October 27, 1874; but in the present case I have inclosed the fire-place within an outer casing, C, which surrounds it at a short distance, and has flanges turned up so that it may be secured water-tight to the tank, while openings D at the end admit air to the space between the fire-place and the outer shell, so that the air will be heated, and in turn transmit a portion of its heat to the water, while, at the same time, the air itself will never be burned or raised to a temperature so high as to injure articles in the drying-room. The tank A is preferably made wider at the top than at the bottom, as shown, so that the amount of water surrounding the fire-place shall be small, and in a thin stratum. This gives the most favorable heating results with the smallest amount of fuel, and when the device is to be used for laundry purposes a light wooden partition, near each side, will cause the water to circulate very rapidly with a constant current. From the tank A the pipe E leads from the fire-place B through the lower part of the drying-chambers E to the chimney G at the opposite end, while the exterior pipe or flue H, which communicates with the air-space surrounding the fire-place, opens into the drying-chamber itself.

This chamber is made of any suitable size for the work to be done. In the present case I have shown it as made with two series of rails, I, to receive the trays J, for the purpose of drying fruit. The walls are made double, as at K K, and also the roof, so that the heated air, which enters the chamber, will have free circulation through it.

The interior walls are perforated, as at L, so that the air, as it rises between the double walls, may escape above and between the trays, thus heating and making more elastic the air which is already loaded with moisture from the drying fruit, and this keeps up the circulation and dries the fruit or other articles rapidly. My heater is closed so as to retain the steam formed from the boiling of the water, and this steam is carried by traversing pipes M through the drying-chamber to assist in the work. As the water formed by the condensation of the steam runs out through the pipe, which is slightly inclined for that purpose, it is saved to replenish the heater.

The operation of my heater and drier will then be as follows: The heater is filled with water, and from its shape, when a fire is made in the fire-place, the thin stratum of water will be rapidly heated, and a very brisk circulation will take place, so that in a short time the whole body of water will be brought to a boiling-point. As the heater-tank is made of wood, it will retain the heat with little reduction for a very long time, and the radiation will be so small that the heat can be easily kept up with a small quantity of fuel.

By surrounding the fire-place with a stratum of air between it and the water, the air is also heated, and not only transmits its heat to the water, but is also prevented from being burnt by any amount of heat from the fire-place; and this is one of the most important features of my machine, because there is never any danger of burning and spoiling the substance to be dried by too fierce a heat or by neglect.

The air circulates freely, and in such a volume as to carry off the moisture from the drying-room with great rapidity through the pipe, which connects with the escape flue, and it is assisted materially in this by the steam-pipes from the heater-tank. The trays being filled with fruit at night, a fire is built, and the whole apparatus may be safely left over night without the slightest danger of fire or of spoiling the articles to be dried, because my combination renders it impossible to elevate the temperature of the air much beyond that of the water in the tank.

Having thus described my invention, what I claim as new, and desire to secure by Letters Patent, is—

1. The combination, with a drying-chamber, of the wooden outer tank A and its fire-place B, with a surrounding air-space, substantially as and for the purpose described.

2. The combination, with the drying-chamber F, of the heating-tank A, with its fire-place B, surrounding air-space C, and air-flue H, substantially as and for the purpose specified.

3. The heater tank A, with its fire-place B and the surrounding air-space C, in combination with the smoke-flue E, leading from the fire-place through the drying-chamber F and the air-flue H opening directly into it, substantially as herein described.

4. The heater A with its fire-place B, air-space C, and the flues E and H, together with the steam-pipes M, in combination with the drying-chamber F, said chamber having its walls double and perforated at L, substantially as and for the purpose herein described.

In witness whereof I have hereunto set my hand and seal.

GEORGE HARRIS. [L. S.]

Witnesses:
WALTER C. BEATIE,
FRANK A. BROOKS.